United States Patent [19]

Bohme

[11] Patent Number: 4,879,834
[45] Date of Patent: Nov. 14, 1989

[54] DEPTH PLANER AND RELEASE FOR SLIDING DOWN FISHING LINE

[76] Inventor: Ed Bohme, 509 - 825 Granville Street, Vancouver, British Columbia, Canada, V6Z 1K9

[21] Appl. No.: 255,832

[22] Filed: Oct. 11, 1988

[30] Foreign Application Priority Data

Dec. 4, 1987 [CA] Canada ................................. 553504

[51] Int. Cl.$^4$ ............................................. A01K 97/00
[52] U.S. Cl. ................................................... 43/43.12
[58] Field of Search ................. 43/43.11, 43.12, 43.13, 43/43.14

[56] References Cited

U.S. PATENT DOCUMENTS

| | | | |
|---|---|---|---|
| 3,765,118 | 10/1973 | Reitler | 43/43.12 |
| 4,028,837 | 6/1977 | Clark | 43/43.12 |
| 4,031,652 | 6/1977 | Johnson | 43/43.12 |
| 4,625,450 | 12/1986 | Roemer | 43/43.12 |
| 4,628,630 | 12/1986 | Bohme | 43/43.12 |

*Primary Examiner*—M. Jordan

[57] ABSTRACT

This invention provides an improved fishing tackle depth planer and release mechanism. Only a strong pull from the fishing rod will cause the mechanism to release, whereas a relatively light tug from the tackle end of the line will trigger the release. The mechanism not only trips the planer out of its diving orientation, but also allows the planer to slide down the fishing line to the lure once a fish has struck. This feature permits the fisherman to use the planer a great distance away from the lure on the fishing line. The release mechanism comprises a plug, a corresponding sleeve and surrounding ring assembly, and holes in each through which the fishing line is threaded. The planer has a hemispherical weight rivetted through it to provide balance without a keeling effect. The orientation of the plug in the sleeve controls the point at which the fishing line pulls the planer and thereby enables the fisherman to adjust the planer for planing sideways to port or starboard, in addition to planing downward through the water. The orientation of the plug also controls the balance of the planer for proper diving with light or heavy tackle. A selection of alternate holes for the fishing line in the planer also allows adjustment for the use of light or extra heavy tackle.

14 Claims, 1 Drawing Sheet

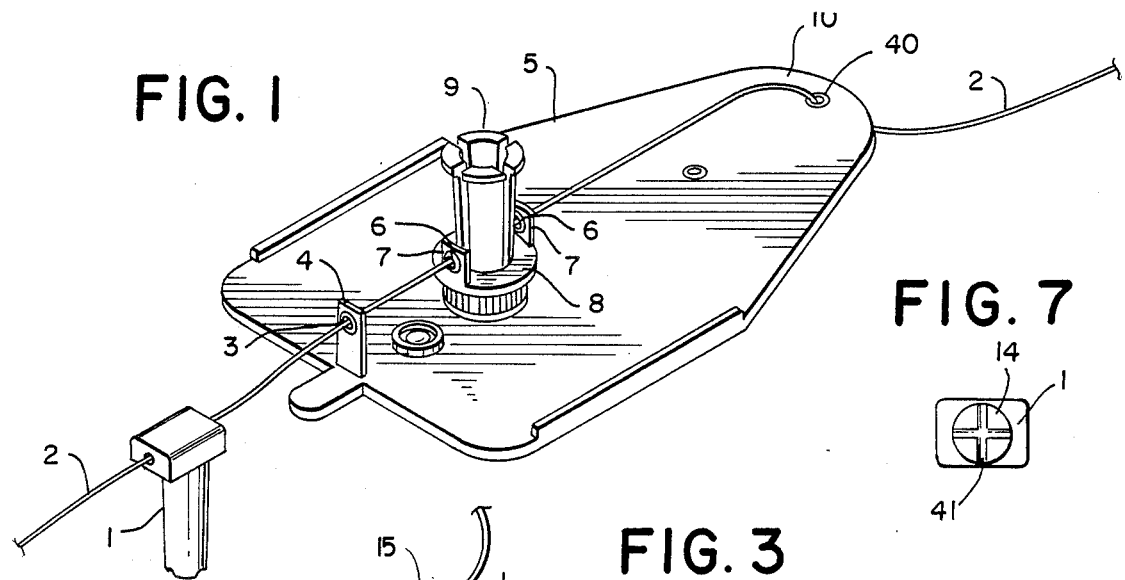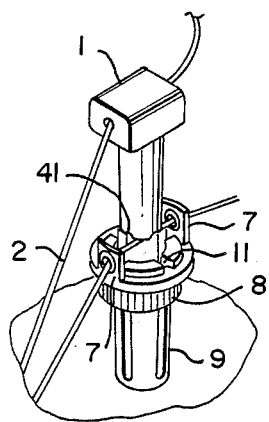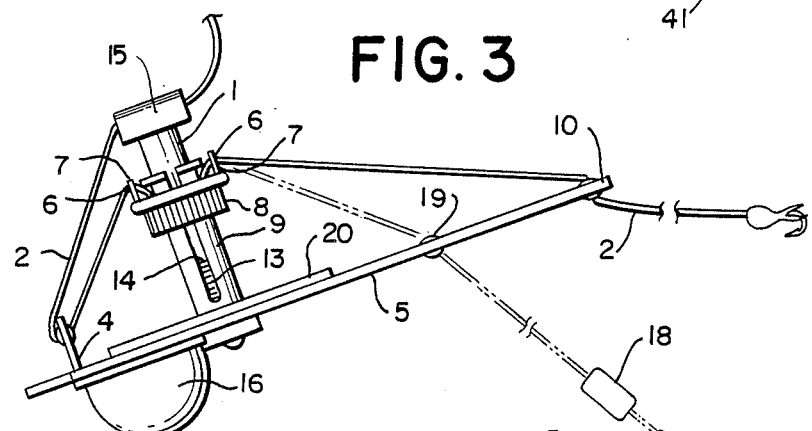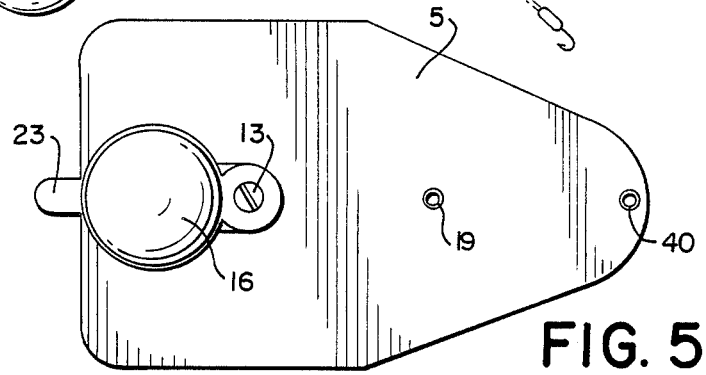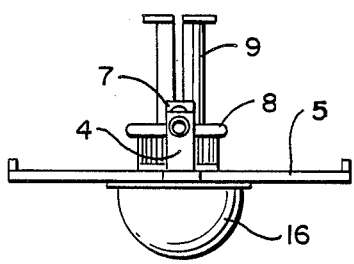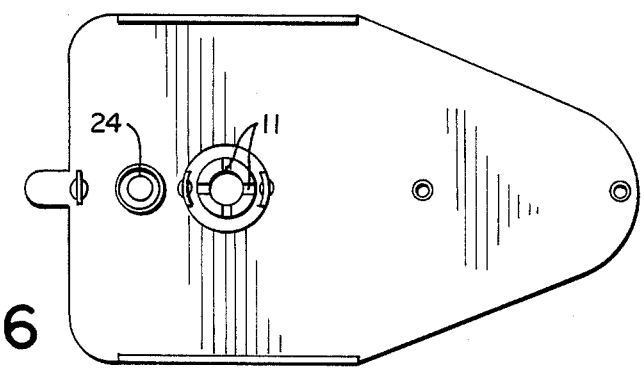

DEPTH PLANER AND RELEASE FOR SLIDING DOWN FISHING LINE

FIELD OF THE INVENTION

The present invention relates to fishing tackle. In particular, the invention provides a depth planer with a release mechanism planer having advantages over previous such devices.

Depth planers are used to take a trolling line down to an appropriate depth. The planer is attached to the fishing line in such a way that the planer tends to slice downward through the water upon the fishing vessel moving forward. It is usually designed to be tripped into a non-diving orientation in response to a strike by a fish. Due to the speed of the trolling vessel and limitations on the weight that can be efficaciously affixed to the fishing line itself, the line would not sink as deep without the use of the planer.

The use of the release mechanism allows the strike to be detected by the fisherman, allows the fishing line to be retrieved with less resistance, allows the fish to fight with less resistance and satisfies any legal stipulation for sport fishing requiring such a release.

The release mechanism is constructed so as to retain the planer in its diving orientation under normal trolling resistance, but so as to trip the planer, when the force on the end of the fishing line exceeds some threshold. The fisherman can then attempt to reel in the fish or other object that may have caused the extra force.

DESCRIPTION OF THE PRIOR TECHNOLOGY

A number of depth planers having release features have been patented. An example of a depth planer with a tripping release mechanism is shown in U.S. Pat. No. 3,643,370, having adjustable tension means relating to the release threshold, and a weight to assist in the sinking action and to correctly balance the planer in its diving orientation.

None of the presently available or disclosed technology shows the features that comprise this invention.

SUMMARY AND OBJECTS OF THE INVENTION

In this invention a fishing tackle depth planer and release mechanism is provided.

The release mechanism is designed such that only a strong pull from the fishing rod will cause the mechanism to release, whereas a relatively light tug from the lure end of the line will trigger the release. The tension required to trigger the release can be adjusted.

These advantages are accomplished by means of a plug, a corresponding sleeve, and holes in each through which the fishing line is threaded. The bottom of the plug is grooved to allow the fishing line to fit recessed within the groove without pinching or otherwise placing undue stress on the line.

When used with the planer shown in the preferred embodiment of this invention, the mechanism not only trips the planer out of its diving orientation, but also allows the planer to slide down the fishing line toward the lure once a fish has struck. This feature permits the fisherman to use the planer a great distance away from the lure on the fishing line. With conventional planers, if the planer were attached more than one rod length away from the lure, the fisherman would not be able to reel the fish into a netting position because the planer would prematurely come up against the tip of the rod and prevent further retrieval of the line. After being tripped, the planer slides so freely that it will go down to the lure even when the line is slack.

There is a weight rivetted onto the planer to assist in its descent and to balance the planer in its diving orientation. The weight is substantially hemispherical in order to eliminate the keeling effect that would occur if the weight were elongated in one direction underneath the planer. This allows the planer to turn easily with the fish.

The orientation of the plug in its sleeve controls the point at which the fishing line pulls on the planer, thereby allowing the fisherman to adjust the planer for planing sideways to port or starboard, in addition to the planing downward through the water. This will help avoid two sets of tackle from becoming tangled behind a trolling boat. Three sets could be used, each with one of the planers: one set up for starboard planing, one for straight planing, and one for planing to port. The orientation of the plug can alternately be used to adjust for the use of light or heavy tackle with the planer, while maintaining the correct balance and diving orientation of the planer.

Another selection of alternate holes through which the line can be threaded also allows for the use of light or extra heavy tackle, even when the plug is adjusted for sideways planing, while maintaining the correct balance and diving orientation of the planer. The hole for light tackle is at the back of the planer. Heavy tackle on a line through this hole would pull the back of the planer down too much. Another hole closer to the center of the planer is therefore provided for heavy tackle. A series of holes could be placed in between for an even finer adjustment of the balance, depending on the weight of the tackle to be used between the planer and the end of the fishing line.

DESCRIPTION OF THE DRAWINGS

FIG. 1 is a perspective of the unprimed release mechanism and depth planer of a preferred embodiment of this invention.

FIG. 2 is a perspective of the device of FIG. 1, showing an intermediate step in the assembly of the device into diving mode.

FIG. 3 is a side perspective of the device of FIG. 1, showing the device assembled into diving mode.

FIG. 4 is an end perspective of the device of FIG. 1.

FIG. 5 is a bottom perspective of the device of FIG. 1.

FIG. 6 is a top perspective of the device of FIG. 1.

FIG. 7 is a bottom perspective of the plug of FIG. 1.

DETAILED DESCRIPTION

Referring to FIG. 1, the release plug 1 is placed onto the fishing line 2, which is also threaded through the hole 3 in the front end tab 4 of the planer 5. The fishing line 2 is also threaded through the holes 6 in the tabs 7 on each side of tensioning ring 8. The ring 8 surrounds the slotted sleeve 9, which is attached to the main body of the planer 5. The line is then threaded through a hole 40 at the tail 10 of the planer 5. The lure or bait would be attached to the fishing line 2 beyond the tail 10 of the planer 5.

In FIG. 2, the plug 1 has a groove 41 on its bottom end into which the fishing line 2 can be set between the tabs 7 of the ring 8 around the sleeve 9. When the ring 8 is depressed down the sleeve 9, the line 2 can follow down the slots 11, and the plug 1 can be inserted into the sleeve 9.

When the ring 8 is raised up the sleeved plug 1, the sleeve is compressed about the plug, as shown in FIG. 3, retaining it in the absence of a force operating to extract the plug. The fishing line 2 now runs underneath the plug 1 between holes 6. The hairpin turn of the fishing line 2 through the front end tab 4 helps to keep the planer where it is set up on the fishing line 2 until the release mechanism is tripped. The release tension of the mechanism is adjusted by screw 13. The depth of the screw's insertion into the sleeve 9 controls the depth to which the plug 1 can be inserted into the sleeve 9. The plug 1 can be inserted into the sleeve until it abuts the end 14 of the screw 13. The deeper the plug 1 is inserted into the sleeve 9, the tighter the ring 8 will hold the plug 1 in by compressing the sleeve 9, due to the increasing taper of the plug 1 toward its head 15. The planer 5 has a rounded lead weight 16, for balance in maintaining the diving orientation of the planer and for assisting the planing action with a sinking effect. When the plug 1 is inserted into the sleeve 9 such that the fishing line 2 to the fishing rod exits the plug on the side closest to the tail 10 of the planer, the planer will be able to handle heavy tackle. If the plug 1 were twisted 180 degrees and inserted with the line exiting the plug on the leading side of the sleeve 9, above tab 7, the planer will balance properly for downward planing with light tackle trailing behind. The hole at 40 can be used with either of these plug placements. If the plug were twisted 90 degrees, the line to the fishing rod would pull on the planer at a point off the center of balance of the planer and would cause the planer to slice sideways through the water as well and downward through the water. The fisherman can thereby adjust the planer to plane either to port, or to starboard. If sideways planing with heavy tackle is desired, the plug can be set for the required sideways planing, while the heavy tackle hole 19 closer to the center 20 of the planer 5 can be used for the fishing line to the tackle, to keep the planer in a steep orientation even with the extra force exerted by the heavier tackle on the planer. Alternatively, extra heavy tackle 18 can used with the the hole 19 in conjunction with a heavy tackle orientation of the plug 1 in order to keep the correct balance and orientation for maximum diving effect. When a fish strikes, the force is transmitted along the fishing line 2 from the tackle, to the tab 7, where the force tends simultaneously to raise the plug 1 in the sleeve 9 and to lower the ring 8 around the sleeve 9. Both actions result in the plug no longer being compressed or retained by the sleeve 9. After it slides out of the sleeve 9, the apparatus returns to the set-up shown in FIG. 1, allowing the planer 5 to slide down the line 2 to the tackle, and to cease its depth planing.

Referring to FIG. 4, the weight 16, the main body of the planer 5, the front end tab 4, the ring 8, the ring tab 7, the slotted sleeve 9 have been discussed above.

Referring to FIG. 5, adjusting screw 13, the weight 16, the light tackle hole 40, the heavy tackle hole 19, and the main body of the planer 5 are shown. There is a front tab 23 aligned with the main body of the planer 5 that assists in the packaging of the planer in a sheet of cardboard.

Referring to FIG. 6, the weight is affixed to the planer with a rivet 24 of the lead comprising the weight. The slots 11 allow the sleeve to flex easily in accomodating the desired extent of plug.

Referring to FIG. 7, the bottom 14 of the plug 1 has two grooves 41 crossing each other at 90 degrees to accomodate the fishing line in any of the recommended plug-in-sleeve orientations described above in regard to FIG. 3. The tension-adjusting screw will abut the bottom 14 of the plug 1 without pinching the fishing line if it is recessed in one of the grooves.

The within-described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

I claim:

1. A fishing tackle depth planer with a release mechanism comprising:
    (a) a plug having a hole through it adapted to receive a fishing line;
    (b) a sleeve adapted to receive the plug;
    (c) ring means adapted to surround the sleeve and to compress the sleeve upon the plug, thereby increasing the force required to extract the plug from the sleeve;
    (d) the ring means having holes through which a fishing line can be threaded and between which the fishing line can be intercepted by the plug as it is received by the sleeve.

2. The apparatus of claim 1 wherein the fishing line is routed indirectly on on the fishing rod side of the mechanism to increase the force that can be absorbed from the fishing rod end of the line without activating the release, and wherein there is a comparatively direct route of the line from the tackle to the mechanism to allow a lesser force from the tackle side of the mechanism to activate the release.

3. The apparatus of claim 1, in which the plug is tapered to allow an adjustment of release threshold tension depending on the depth of insertion of the plug into the sleeve.

4. The apparatus of claim 3, in which
    (a) the sleeve is equipped with a screw to allow the adjustment of the depth to which the plug can be inserted into the sleeve;
    (b) there is at least one groove in the plug to accommodate the interception of a fishing line by the plug upon its insertion into the sleeve;
    (c) the sleeve is slotted to provide flexibility in its reception of the plug;
    (d) a release by the release mechanism causes the depth planer to trip out of its diving orientation;
    (e) the depth planer has a set of alternate holes through which the line can selectively be threaded to maintain balance depending on the weight of the tackle to be used with the apparatus;
    (f) a rounded weight is rivetted onto the planer;
    (g) the release mechanism is mounted on the planer and the planer has a hole in its front end through which a line from a fishing rod can be threaded prior to being threaded through the holes of the ring of the release mechanism;
    (h) the plug has a cap portion and the cap portion has a hole through which a fishing line can be threaded.

5. The apparatus of claim 1, in which the sleeve is equipped with a screw to allow the adjustment of the depth to which the plug can be inserted into the sleeve.

6. The apparatus of claim 1, in which there is at least one groove in the plug to accommodate the interception of a fishing line by the plug upon its insertion into the sleeve.

7. The apparatus of claim 1, in which the sleeve is slotted to provide flexibility in its reception of the plug.

8. The apparatus of claim 1, in which a release by the release mechanism causes the depth planer to trip out of its diving orientation.

9. The apparatus of claim 2, wherein the plug is inserted into the sleeve in an orientation to provide for planing to one side as well as downward.

10. The apparatus of claim 1, in which the depth planer has a set of alternate holes through which the line can selectively be threaded to maintain balance depending on the weight of the tackle to be used with the apparatus.

11. The apparatus of claim 1, in which a rounded weight is rivetted onto the planer.

12. The apparatus of claim 1, in which the mechanism is mounted on the planer.

13. The apparatus of claim 1, in which the mechanism is mounted on the planer and the planer has a hole in its front end through which a line from a fishing rod can be threaded prior to being threaded through the holes of the ring of the release mechanism.

14. The apparatus of claim 1, in which the plug has a cap portion and the cap portion has a hole through which a fishing line can be threaded.

* * * * *